United States Patent [19]

Irick, Jr. et al.

[11] Patent Number: 4,957,779

[45] Date of Patent: Sep. 18, 1990

[54] METHOD FOR PRODUCING A PROTECTIVE LAYER ON A CERAMIC BODY

[75] Inventors: Virgil Irick, Jr., Hockessin; Jack A. Kuszyk; Dennis J. Landini, both of Newark, all of Del.

[73] Assignee: Lanxide Technology Company, LP, Newark, Del.

[21] Appl. No.: 157,432

[22] Filed: Feb. 18, 1988

[51] Int. Cl.⁵ .............................................. B05D 3/00
[52] U.S. Cl. .................................. 427/193; 427/376.2; 427/397.8; 427/423; 427/427; 427/190; 204/62; 501/128
[58] Field of Search ................... 427/376.2, 397.8, 423, 427/419.6, 427, 190, 193; 264/62; 501/128

[56] References Cited

U.S. PATENT DOCUMENTS

| | | | |
|---|---|---|---|
| 2,741,822 | 4/1956 | Udy | 25/157 |
| 3,255,027 | 1/1966 | Talsma | 264/65 |
| 3,296,002 | 1/1967 | Hare | 501/80 |
| 3,298,842 | 1/1967 | Seufert | 501/127 |
| 3,419,404 | 12/1968 | Mao | 501/98 |
| 3,421,863 | 1/1967 | Bawa | 501/128 |
| 3,437,468 | 4/1967 | Seufert | 75/235 |
| 3,473,938 | 10/1969 | Oberlin | 264/65 |
| 3,473,987 | 10/1969 | Sowards | 501/119 |
| 3,789,096 | 1/1974 | Church | 264/60 |
| 3,864,154 | 2/1975 | Gazza et al. | 29/123 |
| 3,973,977 | 8/1976 | Wilson | 501/120 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 0193292 | 3/1986 | European Pat. Off. . |

OTHER PUBLICATIONS

"Oxidation of Molten Aluminum Alloys. Reaction with Refractories"—M. Drouzy and M. Richard—Mar., 1974—Fonderie, France No. 332, pp. 121-128.

"Refractories for Aluminum Alloy Melting Furnaces'"—B. Clavaud and V. Jost—Sep., 1980—Lillian Brassinga (from French) Jan., 1985.

Primary Examiner—William R. Dixon, Jr.
Assistant Examiner—Karl Group
Attorney, Agent, or Firm—Mark G. Mortenson; William E. McShane

[57] ABSTRACT

The present invention relates to a method for producing a protective layer on a ceramic or a ceramic composite body. Stated more particularly, by subjecting a ceramic or a ceramic composite body being interconnected residual metal therein to a particular atmosphere, a protective layer can be formed from the interconnected metal. Such a layer can be protective, especially in corrosion environments which include various gaseous or solid species containing sodium and silicon, such as those found in glass tanks.

11 Claims, 3 Drawing Sheets

METHOD FOR PRODUCING A PROTECTIVE LAYER ON A CERAMIC BODY

FIELD OF THE INVENTION

This invention relates to a method for producing a protective layer on a ceramic or a ceramic composite body by subjecting such bodies to an environment which causes a protective layer to be formed on at least a portion of an outer surface of such bodies. Particularly, it has been discovered that by subjecting a self-supporting ceramic or ceramic composite body, said body comprising an oxidation reaction product of a parent metal, to a particular atmosphere or environment, a protective layer is formed on such bodies, thereby resulting in unexpected and very desirable corrosion resistance properties. The protective layer is formed by utilizing residual interconnected parent metal present in the oxidation reaction product, said residual parent metal also contacting at least one surface of the ceramic composite body.

BACKGROUND OF THE INVENTION AND COMMONLY OWNED PATENT APPLICATIONS

In recent years, there has been an increasing interest in the use of ceramics for structural applications historically served by metals. The impetus for this interest has been the superiority of ceramics with respect to certain properties, such as corrosion resistance, hardness, modulus of elasticity, and refractory capabilities, when compared with metals.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which incorporates one or more diverse types of filler materials such as particulates, fibers, rods, and the like.

There are several known limitations or difficulties in substituting ceramics for metals, such as scaling versatility, capability to produce complex shapes, satisfying the properties required for the end use application, and costs. Several copending patent applications, and one Issued Patent, assigned to the same owner as this application (hereinafter sometimes referred to as Commonly Owned Patent Applications), overcome these limitations or difficulties and provide novel methods for reliably producing ceramic materials, including composites. The method is disclosed generically in Commonly Owned U.S. Pat. No. 4,713,360, issued on Dec. 15, 1987 in the names of Marc S. Newkirk et al and entitled "Novel Ceramic Materials and Methods for Making Same" (a foreign counterpart to this application was published in the EPO on Sept. 25, 1985 as application Ser. No. 0,155,831). This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce α-alumina ceramic structures. This method was improved upon by the application of dopant materials to the surface of the parent metal, as described in Commonly Owned and Copending U.S. patent application Ser. No. 220,935, filed on Jun. 23, 1988 and allowed on Nov. 17, 1988, which is a Rule 62 Continuation of U.S. Ser. No. 822,999, filed Jan. 27, 1986, which is a continuation-in-part of Ser. No. 776,965, filed Sept. 17, 1985, which is a continuation-in-part of Ser. No. 747,788, filed Jun. 25, 1985, which is a continuation-in-part of Ser. No. 632,636, filed Jul. 20, 1984, all in the names of Marc S. Newkirk et al and entitled "Methods of Making Self-Supporting Ceramic Materials" U.S. application Ser. Nos. 822,999; 776,965; 747,788; and 632,636 have been abandoned in favor of allowed U.S. application Ser. No. 220,935 (a foreign counterpart to U.S. application Ser. No. 747,788, was published in the EPO on Jan. 22, 1986, as application Ser. No. 0,169,067).

This oxidation phenomenon was utilized in producing ceramic composite bodies as described in Commonly Owned and Copending U.S. patent application Ser. No. 819,397, filed Jan. 17, 1986, and allowed on Aug. 1, 1988 which is a continuation-in-part of Ser. No. 697,876, filed Feb. 4, 1985, now abandoned both in the names of Marc S. Newkirk et al and entitled "Composite Ceramic Articles and Methods of Making Same" (a foreign counterpart to this application was published in the EPO on Sept. 3, 1986 as application Ser. No. 0,193,292). These applications disclose novel methods for producing a self-supporting ceramic composite body by growing an oxidation reaction product from a parent metal into a permeable mass of filler, (e.g., a silicon carbide particulate filler or an alumina particulate filler) thereby infiltrating the filler with a ceramic matrix. The resulting composite, however, has no defined or predetermined geometry, shape, or configuration.

A method for producing ceramic composite bodies having a predetermined geometry or shape is disclosed in Commonly Owned and Copending U.S. patent application Ser. No. 861,025, filed May 8, 1986, in the names of Marc S. Newkirk et al. In accordance with the method in this U.S. Patent Application, the developing oxidation reaction product infiltrates a permeable preform of filler material (e.g., a silicon carbide preform material) in a direction towards a defined surface boundary. It was discovered that high fidelity is more readily achieved by providing the preform with a barrier means, as disclosed in Commonly Owned and Copending U.S. patent application Ser. No. 861,024, filed May 8, 1986, and allowed on Oct. 11, 1988 in the names of Marc S. Newkirk et al. This method produces shaped self-supporting ceramic bodies, including shaped ceramic composites, by growing the oxidation reaction product of a parent metal to a barrier means spaced from the metal for establishing a boundary or surface. Ceramic composites having a cavity with an interior geometry inversely replicating the shape of a positive mold or pattern are disclosed in Commonly Owned and Copending U.S. patent application Ser. No. 823,542, filed Jan. 27, 1986, in the names of Marc S. Newkirk, et al, and in U.S. patent application Ser. No. 896,157, filed Aug. 13, 1986, in the name of Marc S. Newkirk. U.S. application Ser. No. 823,542 was allowed on Sept. 20, 1988 and U.S. application Ser. No. 896,157 was allowed on Dec. 14, 1988.

As explained in the above-described Commonly Owned Patent Applications, the use of dopant materials can favorably influence or promote the oxidation reaction process. Silicon is a useful dopant with an aluminum parent metal, especially in combination with other dopants, and can be applied externally onto the parent metal for example, as elemental silicon or as silica. As discussed in Commonly Owned patent application Ser. No. 070,006, filed Jul. 6, 1987, and now abandoned which is a continuation-in-part of Ser. No. 908,473, filed Sept. 16, 1987, both in the names of H. Daniel Lesher et al, and entitled "A Method of Making Ceramic Composites", a silicon carbide particulate can be a filler material because of the favorable properties of the resultant composite and because the silicon carbide filler is particularly compatible with the matrix growth process. This compatibility arises from the formation, at elevated temperatures, of a silica film on the external surfaces of the silicon carbide particles. Thus, a silicon carbide preform can be particularly useful because it serves not only as a filler material, but also provides a source of dopant material because of its intrinsic doping properties. Stated more particularly, a silica film formed on a silicon carbide material can be reduced by molten aluminum parent metal to yield a silicon dopant which promotes growth of the polycrystalline matrix through the silicon carbide filler. In addition, the silica coating on silicon carbide particles is advantageous in that there is a reduction of the tendency for the formation of $Al_4C_3$ during growth of the oxidation reaction product of the parent metal. Such $Al_4C_3$ is undesirable because it is an unstable product in the presence of moisture levels normally present in ambient air, resulting in the evolution of methane and the degradation of mechanical properties of the resulting composite body.

Moreover, as described in Commonly Owned and Copending U.S. patent application Ser. No. 908,117, filed on Sept. 16, 1986, and allowed on Nov. 14, 1988 in the names of Stanley J. Luszcz, et al, and entitled "Dense Skin Ceramic Structure and Method of Making Same", a terminal region can be formed integral with a first region. Stated more particularly, a first region is formed by reacting a molten parent metal with an oxidant to form an oxidation reaction product which, optionally, can embed a filler material, thereby forming a ceramic composite body. Transport of molten parent metal used for formation of the first region is thereafter attenuated or discontinued and the first region is then induced to subsequently react with an oxidant to form a terminal region of oxidation reaction product on at least a portion of a surface of the first region. The formed terminal region may have a finer microstructure and/or a different chemical composition from the first region from which the terminal region was formed.

The above-discussed Commonly Owned Patent Applications, and Patent, disclose methods for producing ceramic and/or ceramic composite articles which overcome some of the traditional limitations or difficulties in producing ceramic articles as substitutes for metals in end-use applications.

Common to each of these Commonly Owned Patent Applications, and Patent, is the disclosure of embodiments of a ceramic body comprising an oxidation reaction product interconnected in one or more dimensions (usually in three dimensions) and, if desired, one or more metallic constituents or components. The volume of metal, which typically includes non-oxidized constituents of the parent metal and/or metal reduced from an oxidant or a reactive filler, depends on such factors as the temperature at which the oxidation reaction product is formed, the length of time during which the oxidation reaction is allowed to proceed, the composition of the parent metal, the presence of dopant materials, the presence of reduced constituents of any oxidant or reactive filler materials, etc. Some of the metallic components can be isolated or enclosed, but also a substantial volume percent of metal can be interconnected and accessible, or rendered accessible, from an external surface of the ceramic body. It has been observed for these ceramic bodies that this metal-containing component or constituent (both isolated and interconnected) can range from about 1 to about 40 percent by volume, and sometimes higher. The metallic component can impart certain favorable properties to, or improve the performance of, the ceramic articles in many product applications. For example, the presence of metal in the ceramic structure may have a substantial benefit with respect to imparting fracture toughness, thermal conductivity, or electrical conductivity to the ceramic body.

The entire disclosures of all of the foregoing Commonly Owned Patent Applications and U.S. Patent are expressly incorporated herein by reference.

DEFINITIONS

As used herein in the specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body contains minor or substantial amounts of one or more metallic constituents (isolated and/or interconnected), most typically within a range of from about 1-40% by volume, but may include still more metal.

"Oxidation reaction product" means one or more metals in any oxidized state wherein the metal(s) has given up electrons to or shared electrons with another element, compound, or combination thereof. Accordingly, an "oxidation reaction product" under this definition includes the product of reaction of one or more metals with an oxidant such as oxygen, nitrogen, a halogen, sulphur, phosphorus, arsenic, carbon, boron, selenium, tellurium, and compounds and combinations thereof, for example, methane, ethane, propane, acetylene, ethylene, propylene (the hydrocarbon as a source of carbon), and mixtures such as air, $H_2/H_2O$ and $CO/CO_2$ (as sources of oxygen), the latter two (i.e., $H_2/H_2O$ and $CO/CO_2$) being useful in reducing the oxygen activity of the environment.

"Vapor-phase oxidant", which identifies the oxidant as containing or comprising a particular gas or vapor, means an oxidant in which the identified gas or vapor is the sole, predominant or at least a significant oxidizer of the precursor metal under the conditions obtained in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "oxygen-containing gas" oxidant but not within the definition of a "nitrogen-containing gas" oxidant as those terms are used herein and in the claims. An example of a "nitrogen-containing gas" oxidant is "forming gas", which typically contains about 96 volume percent nitrogen and about 4 volume percent hydrogen.

"Parent metal" refers to that metal (e.g., aluminum), which is the precursor for the polycrystalline oxidation reaction product, and includes that metal as a relatively pure metal or a commercially available metal with impurities and/or alloying constituents, or an alloy in which that metal precursor is the major constituent; and when a specified metal is mentioned as the precursor metal, e.g. aluminum, the metal identified should be read with this definition in mind unless indicated otherwise by the context.

"Parent metal carcass" refers to any of the original body of parent metal remaining which has not been consumed during formation of the ceramic composite body, and typically, which remains in at least partial contact with the formed ceramic composite body. It should be understood that the carcass may also typically include some oxidized constituents of the parent metal therein.

The term "filler" as used herein is intended to include either single constituents or mixtures of constituents which are substantially non-reactive and may be single or multi-phase. Fillers may be provided in a wide variety of forms, such as powders, flakes, platelets, microspheres, whiskers, bubbles, etc., and may be either dense or porous.

SUMMARY OF THE INVENTION

The present invention relates to a method for producing a protective layer on a ceramic or a ceramic composite body and a method of using a ceramic or a ceramic composite body in an environment which causes the body to become at least partially coated with particles entrained in a gaseous exhaust stream, which particles may then interact with the body to form a protective layer on the surface of the body.

In the interest of brevity, ceramic composite bodies will be referred to primarily herein. However, it should be understood that ceramic bodies (i.e., bodies which do not include a filler material) are also modifiable by the method of the present invention and also can be used in the aforementioned environment which results in the formation of a protective layer.

Ceramic composite bodies are obtained by infiltrating a filler material, the filler material being configured in either an unbonded mass or as a preform, with an oxidation reaction product of a molten parent metal (e.g., aluminum) with an oxidant.

More particularly, in one embodiment of the invention a, self-supporting ceramic composite body can be produced by forming an appropriate filler material, such as an alumina filler material or a pre-fired silicon carbide filler material, into a preform by an appropriate forming technique, such as by, for example, slipcasting, sediment casting, dry pressing, etc. The preform may be overlayed at least partially with a barrier material which assists in defining an outer surface of the resultant ceramic composite body by inhibiting or attenuating growth of the oxidation reaction product. The filler material shaped into a preform is then positioned or oriented adjacent to the parent metal such that formation of an oxidation reaction product of the parent metal will occur in a direction towards the oxidant and into the preform, and moreover, towards the barrier means, if the same is utilized. The parent metal is heated to a temperature above its melting point but below the melting point of its oxidation reaction product to form a body of molten metal. At this temperature, or within this temperature range, the molten metal reacts with the oxidant to form the oxidation reaction product. At least a portion of the oxidation reaction product is maintained in contact with and between the molten metal and the oxidant to draw molten metal through the oxidation reaction product towards and into contact with the oxidant such that fresh oxidation reaction product continues to form at an interface between the oxidant and previously formed oxidation reaction product, thus infiltrating the adjacent preform. The reaction is continued for a time sufficient to infiltrate at least a portion of the preform with a polycrystalline material consisting essentially of the oxidation reaction product of the parent metal and, optionally, at least one non-oxidized metallic constituent which is dispersed or distributed throughout the polycrystalline material. The preform should be sufficiently permeable to permit or accommodate growth of the oxidation reaction product within the preform, and to permit the gaseous oxidant to permeate the preform and contact the molten parent metal. It should be understood that the polycrystalline matrix material may exhibit voids or porosity in place of the metal phase, but the volume percent of voids will depend largely on such conditions as temperature, time, dopants, and type of parent metal. If a barrier means is used, the ceramic composite body will continue to grow to the barrier, provided that sufficient parent metal is present to permit such growth.

The resultant ceramic composite body produced according to the above-described methods, can then be exposed to an environment which causes a protective layer to be formed on at least a portion of an external surface of the ceramic composite body. For example, in a first embodiment of the invention, growth of the above-discussed ceramic composite body is changed by modifying the oxidant to which the parent metal is exposed. Specifically, the oxidant, whether a vapor-phase oxidant, solid phase oxidant or some combination of vapor-phase and solid phase oxidants, can be changed to result in the formation of the aforementioned protective layer. Alternatively, as a second embodiment of the invention, the above-described ceramic composite body can be completely formed and separated from its parent metal carcass and the resultant ceramic composite body can thereafter be subjected to a different oxidant (e.g., different vapor-phase oxidant). In the first embodiment of the invention, parent metal can be continually supplied to the process, however, in the second embodiment, parent metal available for reaction comprises primarily residual parent metal which is present in the ceramic composite body. Thus, the protective layer in the second embodiment can be formed due to consumption of residual parent metal from the first formed ceramic composite body.

It has been discovered that when the above-described ceramic composite body is subjected to an oxidant which includes the stoichiometric combustion product of the reaction of natural gas with air, combined with a solution of sodium silicate, thereby together forming a gaseous exhaust stream having entrained therein, for example, particles of sodium silicate, that a protective layer will form on at least a portion of an external surface of the above-described composite bodies. Such discovery is significant and is a major contribution to the art.

DETAILED DESCRIPTION OF THE INVENTION AND PREFERRED EMBODIMENTS

Figure 1:
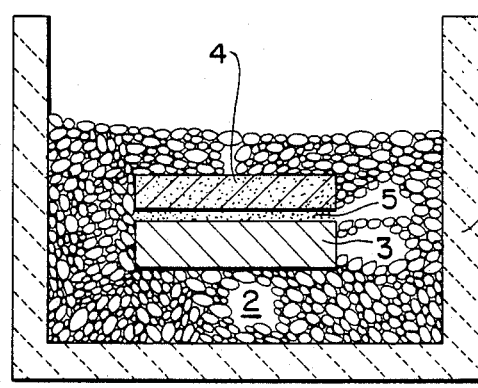
FIG. 1 is a cross-section showing a setup used to produce a ceramic composite body.

To form a ceramic composite body which is to be used in accordance with the method of the present invention, a parent metal, which may be doped as explained below in greater detail, the parent metal being the precursor to the oxidation reaction product, is formed into an ingot, billet, rod, plate or the like and is placed into an inert bed, crucible or other refractory container. The parent metal may comprise one or more pieces and may be suitably shaped by any appropriate means. A permeable mass of filler material, or, in a preferred embodiment, a permeable, shaped preform (described below in greater detail) is manufactured so as to have at least one defined surface boundary and to be permeable to the vapor-phase oxidant, when such a vapor-phase oxidant is used, and to be permeable to the infiltrating oxidation reaction product. The preform is placed adjacent to, and preferably in contact with, at least one surface of, or a portion of a surface of, the parent metal such that at least a portion of the defined surface boundary of the preform is generally positioned distantly, or outwardly spaced apart, from the surface of the parent metal. The preform preferably is in contact with an areal surface of the parent metal; but when desired, the preform may be partially immersed, but not totally immersed, in the molten metal. Total immersion would cut-off or block access of the vapor-phase oxidant into the preform and thus inhibit proper development of the oxidation reaction product which embeds the preform. However, when a vapor-phase oxidant is not used (i.e., the only oxidant used at the process conditions is a solid oxidant or a liquid oxidant), then total immersion, if necessary, of the preform in a molten parent metal becomes a viable alternative. Formation of the oxidation reaction product will occur in a direction towards the defined surface boundary. The set-up of parent metal and permeable preform are placed in a suitable container and into a furnace. The atmosphere in the furnace is an oxidant to permit vapor-phase oxidation of molten parent metal to occur. The furnace is then heated-up to process conditions.

A preform useful in the manufacture of the composite body, when at least one oxidant is a vapor-phase oxidant, is one that is sufficiently porous or permeable to permit the vapor-phase oxidant to permeate into the preform so as to contact the parent metal. The preform also should be sufficiently permeable to accommodate the development or growth of the oxidation reaction product as a matrix within the preform without substantially disturbing, upsetting, or otherwise altering the configuration or geometry of the preform.

A solid, liquid, or vapor-phase oxidant, or a combination of such oxidants, may be employed. For example, typical oxidants include, without limitation, oxygen, nitrogen, a halogen, sulphur, phosphorus, arsenic, carbon, boron, selenium, tellurium, and/or compounds and combinations thereof, for example, silica or silicates (as a source of oxygen), methane, ethane, propane, acetylene, ethylene, and propylene (as sources of carbon), and mixtures such as air, $H_2/H_2O$ and $CO/CO_2$ (as sources of oxygen) the latter two (i.e., $H_2/H_2O$ and $CO/CO_2$) being useful in reducing the oxygen activity of the environment. Accordingly, the ceramic structure of the invention may comprise an oxidation reaction product comprising one or more of oxides, nitrides, carbides, borides and oxynitrides. More specifically, the oxidation reaction product may, for example, be one or more of aluminum oxide, aluminum nitride, silicon carbide, silicon boride, aluminum boride, titanium nitride, zirconium nitride, titanium boride, zirconium boride, silicon nitride, hafnium boride and tin oxide. Although the oxidation reaction is usually described as employing a vapor-phase oxidant, either alone or in conjunction with an oxidant which is a solid or liquid under the process conditions, it should be understood that the utilization of a vapor-phase oxidant is not necessary to produce the first formed ceramic body. When a vapor-phase oxidant is not employed and an oxidant which is a solid or liquid under the process conditions is used, the preform need not be permeable to the surrounding atmosphere. However, the preform should still be sufficiently permeable to accomodate the development or growth of the oxidation reaction product as a matrix within the preform without substantially disturbing, upsetting, or otherwise altering the configuration or geometry of the preform.

The use of solid or liquid oxidants within the preform may create an environment more favorable to the oxidation kinetics of the parent metal than the environment outside the preform. This enhanced environment is beneficial in promoting matrix development within the preform to the boundary and minimizing overgrowth. When a solid oxidant is employed, it may be dispersed through the entire preform or through a portion of the preform adjacent to the parent metal, such as in particulate form and admixed with the preform, or it may be utilized as coatings on the particles comprising the preform. Suitable solid oxidants may include suitable elements, such as boron or carbon, or suitable reducible compounds, such as silicon dioxide (as a source of oxygen) or certain borides of lower thermodynamic stability than the boride reaction product of the parent metal.

If a liquid oxidant is employed, the liquid oxidant may be dispersed throughout the entire preform or a portion thereof adjacent to the molten metal. Reference to a liquid oxidant means one which is a liquid under the oxidation reaction conditions, and so a liquid oxidant may have a solid precursor, such as a salt, which is molten or liquid at the oxidation reaction conditions. Alternatively, the liquid oxidant may be a liquid precursor, e.g. a solution of a material, which is used to coat part or all of the porous surfaces of the preform and which is melted or decomposed at the process conditions to provide a suitable oxidant moiety. Examples of liquid oxidants as herein defined include low melting glasses.

As explained in the Commonly Owned Patent Applications and Patent, the addition of dopant materials, in conjunction with, for example, aluminum parent metal, can favorably influence the oxidation reaction process. The function or functions of the dopant material can depend upon a number of factors other than the dopant material itself. These factors include, for example, the end product desired, the particular combination of dopants when two or more dopants are used, the use of an externally applied dopant in combination with an alloyed dopant, the concentration of the dopant, the oxidizing environment, and the process conditions.

The dopant or dopants used in conjunction with the parent metal (1) may be provided as alloying constituents of the parent metal, or (2) may be applied to at least a portion of the surface of the parent metal, or any combination of techniques (1) and (2) may be employed. For example, an alloyed dopant may be used in combination with an externally applied dopant. A source of the dopant may be provided by placing either a dopant powder or a rigid body of dopant in contact with at least a portion of the parent metal surface. For example, a thin sheet of silicon-containing glass can be placed upon a surface of an aluminum parent metal. When the aluminum parent metal (which may be internally doped with Mg) overlaid with the silicon-containing material is heated in an oxidizing environment (e.g., in the case of aluminum in air, between about 850° C. to about 1450° C., preferably about 900° C. to about 1350° C.), growth of the polycrystalline ceramic material occurs. In the case where the dopant is externally applied to at least a portion of the surface of the aluminum parent metal, the polycrystalline aluminum oxide structure generally grows substantially beyond the dopant layer (i.e., to beyond the depth of the applied dopant layer). In any case, one or more of the dopants may be externally applied to the parent metal surface. Additionally, any concentration deficiencies of the dopants alloyed within the parent metal may be augmented by additional concentration of the respective dopant(s) applied external to the parent metal.

Useful dopants for an aluminum parent metal, particularly with air as the oxidant, include, for example, magnesium, zinc and silicon, in combination with each other or in combination with other dopants described below. These metals, or a suitable source of the metals, may be alloyed into the aluminum-based parent metal at concentrations for each of between about 0.1–10% by weight based on the total weight of the resulting doped metal. Concentrations within this range appear to initiate the ceramic growth, enhance metal transport and favorably influence the growth morphology of the resulting oxidation reaction product. The concentration range for any one dopant will depend on such factors as the combination of dopants and the process temperature.

Other dopants which are effective in promoting alumina polycrystalline oxidation reaction product growth, from aluminum parent metal systems are, for example, germanium, tin and lead, especially when used in combination with magnesium. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1–10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying materials to be added at a lower temperature.

One or more dopants may be used in conjunction with the parent metal. For example, in the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with an aluminum parent metal, include sodium and lithium, which may be used individually or in combination with one or more other dopants depending on the process conditions. Sodium and lithium may be used in very small amounts (in the parts per million range, typically about 100–200 parts per million) and each may be used alone or together, or in combination with other dopant(s). Calcium, boron, phosphorus, yttrium, and rare earth elements such as cerium, lanthanum, praseodymium, neodymium and samarium are also useful dopants, and herein again especially when used in combination with other dopants.

The dopant materials, when used externally, are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant, quantities as low as 0.00003 gram of silicon per gram of parent metal, or about 0.0001 gram of silicon per square centimeter of exposed parent metal surface, together with a second dopant source of magnesium, to produce the polycrystalline ceramic growth phenomenon. It also has been found that a ceramic structure is achievable from an aluminum-silica alloy parent metal using air or oxygen as the oxidant by using MgO as the dopant in an amount greater than about 0.0008 gram of Mg per gram of parent metal to be oxidized and greater than 0.003 gram of Mg per square centimeter of parent metal surface upon which the MgO is applied. It appears that to some degree an increase in the quantity of dopant materials will decrease the reaction time necessary to produce the ceramic body, but this will depend upon such factors as type of dopant, the parent metal and the reaction conditions.

Where the parent metal is aluminum internally doped with magnesium and the oxidizing medium is air or oxygen, it has been observed that magnesium is at least partially volatilized out of the alloy at temperatures of from about 820° to 950° C. In such instances of magnesium-doped systems, the magnesium forms a magnesium oxide and/or magnesium aluminate spinel phase at the surface of the molten aluminum alloy and during the growth process such magnesium compounds remain primarily at the initial oxide surface of the parent metal alloy (i.e., the "initiation surface") in the growing ceramic structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting prior to using the polycrystalline ceramic product.

In a first embodiment of the invention, during growth of the polycrystalline oxidation reaction product, a different vapor-phase oxidant is introduced. In this context, "different" should be understood as meaning having a composition which is chemically different from the composition of an initial vapor (or solid) phase oxidant. Thus, the second oxidation reaction product formed with the "different" vapor-phase oxidant will result in the formation of two ceramic bodies or phases integrally attached to each other having graded properties (e.g., a layer can be formed on a first formed ceramic composite body).

In a second embodiment, a ceramic composite body is first completely formed, and thereafter the completely formed ceramic composite body is exposed to an oxidant, preferably a "different" oxidant than that which was used to form the oxidation reaction product which serves as a matrix for the embedded filler material in the ceramic composite body. In this second embodiment, residual interconnected parent metal in the ceramic composite body is drawn towards at least one surface of the ceramic composite body and is caused to react with the "different" oxidant. In a preferred embodiment, the ceramic composite body is exposed to an environment comprising the combustion product of natural gas with oxygen mixed with a particles of sodium silicate which are entrained in the combustion product stream. Such exposure results in the formation of a protective layer on the ceramic composite body. This protective layer can be formed as a thin or thick layer on a surface of a first formed ceramic composite body, and provides very desirable corrosion resistance to, for example, corrosive glass slags contained in, for example, exhaust gases in a glass tank. Thus, the placement of a formed ceramic composite body in the above-described gaseous environment can result in the formation of a corrosion resistant protective layer on at least a portion of the surface of the first formed ceramic composite body.

EXAMPLES

The following description is generic to each of the following examples, unless the text indicates differently. FIG. 1 shows a cross-section of a typical assembly which was utilized to form a ceramic composite body. Particularly, a refractory boat (1) was partially filled with wollastonite particles (2) (coarse fiber-Nyad SP, from NYCO, Inc.), which particles acted as a barrier material to confine the oxidation reaction. An ingot of an aluminum alloy was then placed upon the wollastonite bedding. The size of the ingots of aluminum was not critical to the examples except that a sufficient amount of aluminum needed to be present to permit complete infiltration of the preform. Three different aluminum alloys were used in the following examples. The composition of the three different aluminum alloys was determined through chemical analysis to be consistent with the nominal specification for each alloy. Specifically, Alloy No. 1 comprised 7.5-9.5% Si, 3.0-4.0% Cu, <2.9% Zn, <1.5% Fe, <0.5% Mn, <0.5% Ni, <0.35% Sn, and <0.1% Mg), except that the Mg concentration was found to be approximately 0.17% to 0.18% by weight. The higher Mg level is believed to be important in view of the established role of Mg as a dopant or a promoter of the oxidation reaction. Alloy No. 2 comprised 5.0–6.5% Zn, <0.25% Cu, 0.4–0.6% Cr, <0.15% Si, <0.40% Fe, 0.50–0.65% Mg, <0.10% Mn and 0.15–0.25% Ti; and Alloy No. 3 comprised <0.03% Zn, <0.10% Cu and Sn combined, 9.0–10.0% Si, <0.2% Fe, 2.4–3.0% Mg and <0.005% Be.

An interfacial layer (5) was then placed on a top surface of the alloy (3). The interfacial layer (5) was deposited in a thickness of about 1/32–1/16 inch. The four different interfacial layers (5) used in the following Examples were:

(1) A powdered nickel metal (hereinafter referred to as "nickel metal powder") obtained from Atlantic Engineers having a size of $-325$ mesh;

(2) A powdered material consisting primarily of silica and sold under the tradename of Leecote ® Lx-60 WPS by the Acme Resin Corporation of Madison, Ohio;

(3) A powdered silicon metal (hereinafter referred to as "silicon metal powder") obtained from Atlantic Equipment Engineers of Bergenfield, N.J. and having a size of $-325$ mesh; and (4) A powdered sand material (hereinafter referred to as "sand") obtained from Pennsylvania Foundry Supply and Sand Company of Philadelphia, Pa. and having a size of 100 grit.

A preform (4) was then placed on top of the aluminum alloy ingot (3) with the interfacial layer (5) placed therein. The preform (4) was manufactured by sedimentation casting techniques as disclosed in the aforementioned Commonly Owned Patent Applications. Specifically, appropriate filler materials having different sizes and different chemical compositions, as discussed below, were slurried in water containing about 2% by weight of a polyvinyl acetate latex binder (Elmer's Wood Glue). Preforms were prepared by pouring the slurry into an appropriate mold having a desirable inner diameter. The slurry was allowed to stand undisturbed which permitted the solid particles to settle into a layer of an appropriate thickness (e.g., approximately ½ inch thick). Excess water in the casting process was poured and sponged from the surface.

The different filler materials utilized in the following Examples were:

(1) A particulate of silicon carbide (hereinafter referred to as "No. 1 SiC") obtained from Norton Co., of Wooster, Mass. and having an initial size of about 1000 grit;

(2) A particulate of silicon carbide (hereinafter referred to as "No. 2 SiC" obtained from Norton Co., of Wooster, Mass. and having an initial size of about 500 grit;

(3) A particulate of C-75 Unground alumina (hereinafter referred to as "No. 1 $Al_2O_3$") obtained from Alcan of Cleveland, Ohio and having a particulate size of about $-100$ mesh;

(4) A particulate of C-73 Unground alumina (hereinafter referred to as "No. 2 $Al_2O_3$") obtained from Alcan of Cleveland, Ohio and having a particulate size of about $-100$ mesh;

(5) A particulate of 38 Alundum alumina (hereinafter referred to as "No. 3 $Al_2O_3$") obtained from Norton Co., of Wooster, Mass. and having a particulate size of about 24 grit; and (6) A particulate of E-28 Alundum alumina (hereinafter referred to as "No. 4 $Al_2O_3$") obtained from Norton Co., of Wooster, Mass. and having a particulate size of about 90 grit.

It is noted that when a silicon carbide filler (e.g., No. 1 SiC or No. 2 SiC) was used, the filler was first prefired at a temperature of about 1250° C. for about 24 hours, prior to forming a slurry. The prefired filler was then ground to about −200 mesh.

Additional wollastonite particles (2) were then placed around and on top of the preform/metal assembly, which wollastonite particles confined the oxidation reaction to the volume contained within the preform (4). The refractory boat (1), with its contents, was placed into an electric resistance furnace and was heated to an appropriate temperature (as set forth later herein) and for an appropriate time (as set forth later herein) to promote growth of the oxidation reaction product.

Upon removal from the furnace, it was found that an aluminum oxide ceramic matrix had grown from the surface of the molten aluminum alloy and had infiltrated the preforms.

Table 1 sets forth the constituents used to form each ceramic composite body and the manufacturing parameters (e.g., temperature and time) used to form the ceramic composite bodies. Additionally, Table 1 sets forth the percent filler and percent matrix present in the formed ceramic composite bodies, as well as percent residual metal present therein.

nos. 1–8 were then removed from the furnace (14) and were examined.

Figure 3:
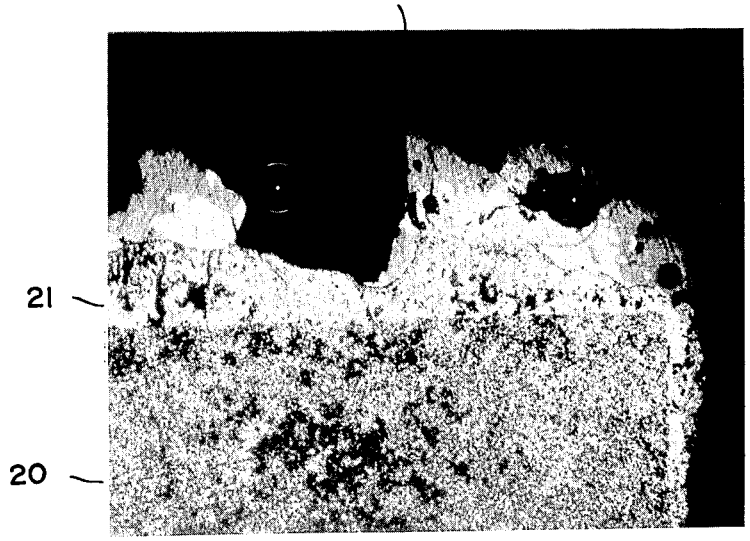
FIGS. 3-5 are optical micrographs at 50× showing the growth of a protective layer from a ceramic composite body.
Figure 4:
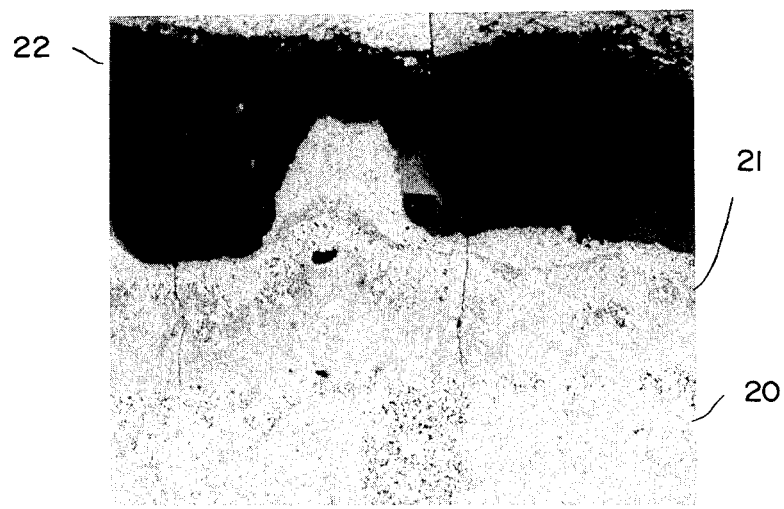
Figure 5:
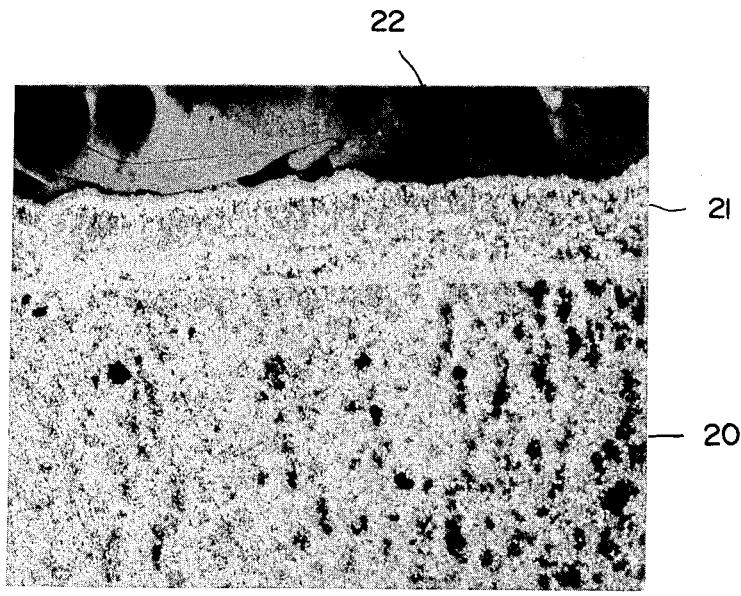

FIGS. 3, 4 and 5 are optical micrographs taken at 50× of cross sections of sample nos. 1, 3 and 4, respectively, after the samples were exposed to the gaseous environment (15). Regions (20) correspond to the composite bodies which were formed prior to exposure to the gaseous or glassy solid environment (15); regions (21) correspond to the layer which was formed on the samples (12) after exposure to the gaseous environment (15); and regions (22) correspond to a glassy phase which deposited on samples (12), after cooling of the furnace (14).

The growth of the regions (21) was surprising in two respects. First, it was surprising that the regions (21) formed and second, it was even more surprising that the region (21) served as a protective layer protecting against corrsion of the composite bodies. In this regard, typically, when a standard (i.e., known to the art) silicon carbide ceramic body is exposed to a gaseous environment similar to the gaseous environment (15), corrosion of the body is expected to occur. However, contrary to the normal tendency, bodies produced according to the aforementioned procedures actually grew or were enlarged to some extent, as opposed to being corroded. However, even those cases where a portion of the body may corrode, such corrosion is minimal compared to known silicon carbide or alumina ceramic

TABLE 1

| Sample No. | Alloy | Interfacial Layer | Filler | Ramp-up Time (hrs) | Dwell Time (hrs) | Dwell Temp | Cool-Down Time (hrs) | % Filler / % Matrix | % Residual Metal |
|---|---|---|---|---|---|---|---|---|---|
| 1 | No. 2 | Si | No. 1 SiC | 10 | 160 | 1000° C. | 10 | 32.1/45.8 | 21.9 |
| 2 | No. 1 | Ni | No. 1 SiC | 10 | 160 | 1000° C. | 10 | 27.9/57.7 | 13.5 |
| 3 | No. 1 | Ni | No. 2 SiC | 10 | 160 | 1000° C. | 10 | 45.9/42.7 | 10.9 |
| 4 | No. 1 | Ni | No. 1 Al$_2$O$_3$ | 10 | 160 | 1000° C. | 10 | * | 15–30 |
| 5 | No. 1 | Leecote ® | No. 1 Al$_2$O$_3$ | 10 | 160 | 1000° C. | 10 | * | 30 |
| 6 | No. 1 | Ni | No. 2 Al$_2$O$_3$ | 10 | 160 | 1000° C. | 10 | * | 15–30 |
| 7 | No. 1 | Sand | No. 3 Al$_2$O$_3$ | 10 | 1000 | 1050° C. | 10 | * | 15 |
| 8 | No. 3 | None | No. 4 Al$_2$O$_3$ | 7 | 60 | 1175° C. | 10 | * | 15–20 |

* - not measured

Figure 2:
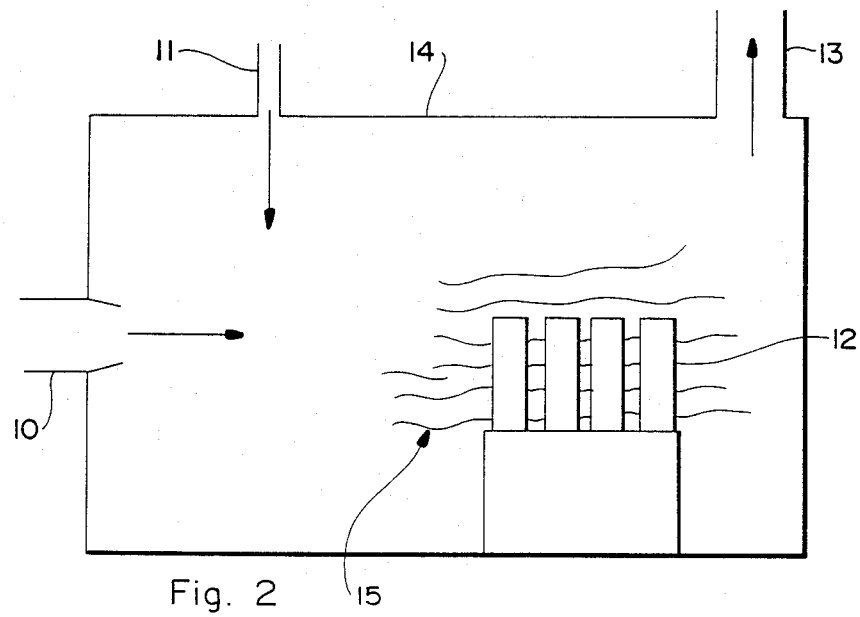
FIG. 2 is a schematic drawing which shows an apparatus which can be used to expose a ceramic composite body to a particular gaseous environment.

After formation of each of the ceramic composite bodies corresponding to sample nos. 1–8, each composite body was finished machined, where necessary, and each composite body was then subjected to substantially the same gaseous environment. Particularly, as shown in FIG. 2, sample nos. 1–8 (represented by the numeral 12), were placed into a furnace (14). The furnace (14) was heated by a burner (10) which was fueled with a natural gas/air mixture. The gas composition produced due to combustion of the natural gas with air comprised a stiochiometric combustion of natural gas with air. The combustion gas was modified due to an injection of a sodium silicate solution downstream from the burner (10) by an injection nozzle (11) (e.g., thereby forming a gas stream having sodium silicate particles entrained therein). The sodium silicate solution had a density of about 1.4 g/cc, a ratio of Na$_2$O/SiO$_2$ of about 0.4 and was injected at a rate of about 2.5 liter/hour. The gas inlet temperature adjacent to the burner (10) was about 1070° C., which resulted in a surface temperature of the samples (12) being about 1000° C. The gas flow rate through the furnace (14), in the direction of the arrows in FIG. 2, (i.e., into the furnace (14) at the burner (10) and out of the furnace (14) through the exhaust port (13)) was about 15 meters/sec. The total amount of exposure time of the samples (12) to the gaseous environment (15) was about 100 hours. Sample materials.

While the present invention has been disclosed in its preferred embodiments, it is to be understood that the present invention should not be specifically limited thereto, because various modifications will occur to an artisan of ordinary skill. Thus, the present invention should be interpreted in the spirit of the following claims.

What is claimed is:

1. A method for producing a self-supporting ceramic body comprising:

(a) providing a parent metal body:

(b) heating said parent metal body to a temperature above its melting point but below the melting point of its oxidation reaction product to form a body of molten parent metal and, at said temperature, (1) reacting the molten parent metal with an oxidant to form an oxidation reaction product of the parent metal, (2) maintaining at least a portion of said oxidation reaction product in contact with and between said body of molten metal and said oxidant, to progressively draw molten metal from said body of molten metal through the oxidation reaction product and into contact with said oxidant, thereby forming fresh oxidation reaction product at an interface between the oxidant and previously formed oxidation reaction product, and
(3) continuing said reacting for a time sufficient to form a first ceramic body;
(c) exposing said first ceramic body to an environment comprising glassy particles which causes growth of a layer from at least a portion of a surface of said first ceramic body; and
(d) continuing said exposure in step (c) for a time sufficient to form a protective layer on at least a portion of said first ceramic body.

2. A method for producing a self-supporting ceramic composite body comprising:
(a) providing a parent metal body;
(b) positioning said parent metal adjacent to a permeable mass of filler and orienting said parent metal and said filler relative to each other so that formation of said oxidation reaction product will occur in a direction towards and into said mass of filler;
(c) heating said parent metal body to a temperature above its melting point but below the melting point of its oxidation reaction product to form a body of molten parent metal and, at said temperature,
(1) reacting the molten parent metal with an oxidant to form an oxidation reaction product of the parent metal,
(2) maintaining at least a portion of said oxidation reaction product in contact with and between said body of molten metal and said oxidant, to progressively draw molten metal from said body of molten metal through the oxidation reaction product towards the oxidant and towards and into the adjacent mass of filler so that fresh oxidation reaction product continues to form within the mass of filler at an interface between the oxidant and previously formed oxidation reaction product, and
(3) continuing said reacting for a time sufficient to form a first ceramic composite body;
(d) exposing said first ceramic composite body to an environment comprising glassy particles which causes growth of a layer from at least a portion of a surface of said first ceramic composite body; and
(e) continuing said exposure in step (d) for a time sufficient to form a protective layer on at least a portion of said first ceramic composite body.

3. The method of claim 1, wherein said environment comprising glassy particles further comprises a combustion product of the reaction of natural gas with air.

4. The method of claim 1, wherein said glassy particles comprise at least one sodium silicate glass.

5. The method of claim 1, wherein said protective layer comprises oxidation reaction product.

6. The method of claim 2, wherein said protective layer comprises oxidation reaction product.

7. The method of claim 2, wherein said permeable mass of filler comprises at least one material selected from the group consisting of alumina and silicon carbide.

8. The method of claim 1, wherein said parent metal comprises aluminum.

9. The method of claim 2, wherein said parent metal comprises aluminum.

10. The method of claim 1, wherein said oxidant comprises at least one oxidant selected from the group consisting of a vapor phase oxidant, a solid phase oxidant and a liquid phase oxidant.

11. The method of claim 2, wherein said oxidant comprises at least one oxidant selected from the group consisting of a vapor phase oxidant, a solid phase oxidant and a liquid phase oxidant.

* * * * *